(12) United States Patent
Ellison et al.

(10) Patent No.: US 7,013,481 B1
(45) Date of Patent: Mar. 14, 2006

(54) ATTESTATION KEY MEMORY DEVICE AND BUS

(75) Inventors: Carl M. Ellison, Portland, OR (US); Roger A. Golliver, Beaverton, OR (US); Howard C. Herbert, Phoenix, AZ (US); Derrick C. Lin, San Mateo, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,667

(22) Filed: Mar. 31, 2000

(51) Int. Cl.
*G06F 11/30* (2006.01)

(52) U.S. Cl. .......................... 726/4; 713/165; 713/171; 713/176; 713/193; 713/194

(58) Field of Classification Search ........ 713/200–201, 713/155–156, 164–168, 170–176, 186, 187, 713/193, 194; 380/30, 259–266; 340/545.1; 711/163, 153, 152, 173, 170; 726/4, 2
See application file for complete search history.

(56) References Cited

U.S. PATENT DOCUMENTS

| | | | |
|---|---|---|---|
| 4,037,214 A | 7/1977 | Birney et al. | |
| 4,162,536 A | 7/1979 | Morley | 714/18 |
| 4,247,905 A | 1/1981 | Yoshida et al. | 711/166 |
| 4,276,594 A | 6/1981 | Morley | 713/160 |
| 4,278,837 A | 7/1981 | Best | |
| 4,307,447 A | 12/1981 | Provanzano et al. | 700/1 |
| 4,319,323 A * | 3/1982 | Ermolovich et al. | 711/100 |
| 4,347,565 A | 8/1982 | Kaneda et al. | 711/6 |
| 4,366,537 A | 12/1982 | Heller et al. | |
| 4,521,852 A | 6/1985 | Guttag | |
| 4,571,672 A | 2/1986 | Hatada et al. | |
| 4,759,064 A | 7/1988 | Chaum | 380/30 |
| 4,795,893 A | 1/1989 | Ugon | 235/382 |
| 4,825,052 A | 4/1989 | Chemin et al. | 235/380 |

(Continued)

FOREIGN PATENT DOCUMENTS

DE 4217444 12/1992

(Continued)

OTHER PUBLICATIONS

"M68040 User's Manual", 1993, Motorola Inc., p. 1-5—p. 1-9, p. 1-13-p. 1-20, p. 2-1-p. 2-3, p. 4-1, p. 8-9-p. 8-11.

(Continued)

*Primary Examiner*—Gregory Morse
*Assistant Examiner*—Tongoc Tran
(74) *Attorney, Agent, or Firm*—Blakely, Sokoloff, Taylor & Zafman LLP

(57) ABSTRACT

In an embodiment of the present invention, a technique is provided for remote attestation. An interface maps a device via a bus to an address space of a chipset in a secure environment for an isolated execution mode. The secure environment is associated with an isolated memory area accessible by at least one processor. The at least one processor operates in one of a normal execution mode and the isolated execution mode. A communication storage corresponding to the address space allows the device to exchange security information with the at least one processor in the isolated execution mode in a remote attestation.

80 Claims, 6 Drawing Sheets

U.S. PATENT DOCUMENTS

| | | | |
|---|---|---|---|
| 4,907,270 A | 3/1990 | Hazard | 713/181 |
| 4,907,272 A | 3/1990 | Hazard | 705/65 |
| 4,910,774 A | 3/1990 | Barakat | 705/181 |
| 5,007,082 A | 4/1991 | Cummins | 705/67 |
| 5,022,077 A | 6/1991 | Bealkowski et al. | |
| 5,075,842 A | 12/1991 | Lai | |
| 5,079,737 A | 1/1992 | Hackbarth | |
| 5,255,379 A | 10/1993 | Melo | |
| 5,293,424 A | 3/1994 | Holtey et al. | |
| 5,317,705 A | 5/1994 | Gannon et al. | 718/100 |
| 5,319,760 A | 6/1994 | Mason et al. | 711/208 |
| 5,386,552 A | 1/1995 | Garney | |
| 5,421,006 A | 5/1995 | Jablon et al. | |
| 5,434,999 A | 7/1995 | Goire et al. | 717/167 |
| 5,437,033 A | 7/1995 | Inoue et al. | 714/10 |
| 5,442,645 A | 8/1995 | Ugon et al. | 714/736 |
| 5,455,909 A | 10/1995 | Blomgren et al. | |
| 5,459,867 A * | 10/1995 | Adams et al. | 709/321 |
| 5,459,869 A | 10/1995 | Spilo | |
| 5,473,692 A | 12/1995 | Davis | |
| 5,479,509 A | 12/1995 | Ugon | |
| 5,504,922 A | 4/1996 | Seki et al. | 703/25 |
| 5,511,217 A | 4/1996 | Nakajima et al. | 718/100 |
| 5,522,075 A | 5/1996 | Robinson et al. | 718/100 |
| 5,528,231 A | 6/1996 | Patarin | 340/5.8 |
| 5,533,126 A | 7/1996 | Hazard | 713/187 |
| 5,566,323 A | 10/1996 | Ugon | 711/154 |
| 5,568,552 A | 10/1996 | Davis | |
| 5,606,617 A | 2/1997 | Brands | 380/30 |
| 5,615,263 A | 3/1997 | Takahashi | |
| 5,628,022 A | 5/1997 | Ueno et al. | |
| 5,657,445 A | 8/1997 | Pearce | |
| 5,717,903 A | 2/1998 | Bonola | |
| 5,720,609 A | 2/1998 | Pfefferle | 431/326 |
| 5,721,222 A | 2/1998 | Bernstein et al. | 514/89 |
| 5,729,760 A | 3/1998 | Poisner | |
| 5,737,604 A | 4/1998 | Miller et al. | 713/1 |
| 5,737,760 A | 4/1998 | Grimmer, Jr. et al. | |
| 5,757,919 A | 5/1998 | Herbert et al. | |
| 5,764,969 A | 6/1998 | Kahle et al. | |
| 5,796,835 A | 8/1998 | Saada | 713/172 |
| 5,796,845 A | 8/1998 | Serikawa et al. | |
| 5,805,712 A | 9/1998 | Davis | |
| 5,825,875 A | 10/1998 | Ugon | 705/65 |
| 5,835,594 A | 11/1998 | Albrecht et al. | |
| 5,844,986 A * | 12/1998 | Davis | 713/187 |
| 5,852,717 A | 12/1998 | Bhide et al. | |
| 5,854,913 A | 12/1998 | Goetz et al. | 712/210 |
| 5,867,577 A | 2/1999 | Patarin | 705/67 |
| 5,872,994 A | 2/1999 | Akiyama et al. | |
| 5,890,189 A | 3/1999 | Nozue et al. | |
| 5,900,606 A | 5/1999 | Rigal et al. | 235/375 |
| 5,901,225 A | 5/1999 | Ireton et al. | 714/7 |
| 5,903,752 A | 5/1999 | Dingwall et al. | 718/103 |
| 5,937,063 A | 8/1999 | Davis | |
| 5,953,502 A | 9/1999 | Helbig, Sr. | |
| 5,970,147 A * | 10/1999 | Davis | 713/172 |
| 5,978,481 A | 11/1999 | Ganesan et al. | |
| 5,987,557 A | 11/1999 | Ebrahim | |
| 6,014,745 A | 1/2000 | Ashe | |
| 6,055,637 A | 4/2000 | Hudson et al. | |
| 6,058,478 A | 5/2000 | Davis | |
| 6,061,794 A | 5/2000 | Angelo et al. | 726/3 |
| 6,075,938 A | 6/2000 | Bugnion et al. | 703/27 |
| 6,085,296 A | 7/2000 | Karkhanis et al. | |
| 6,092,095 A | 7/2000 | Maytal | 718/100 |
| 6,101,584 A | 8/2000 | Satou et al. | |
| 6,115,816 A * | 9/2000 | Davis | 713/153 |
| 6,125,430 A | 9/2000 | Noel et al. | |
| 6,148,379 A | 11/2000 | Schimmel | |
| 6,158,546 A | 12/2000 | Hanson et al. | |
| 6,175,925 B1 | 1/2001 | Nardone et al. | |
| 6,178,509 B1 | 1/2001 | Nardone et al. | |
| 6,182,089 B1 | 1/2001 | Ganapathy et al. | 707/206 |
| 6,192,455 B1 | 2/2001 | Bogin et al. | |
| 6,205,550 B1 | 3/2001 | Nardone et al. | |
| 6,212,635 B1 | 4/2001 | Reardon | 713/165 |
| 6,222,923 B1 | 4/2001 | Schwenk | 380/44 |
| 6,249,872 B1 | 6/2001 | Wildgrube et al. | |
| 6,269,392 B1 | 7/2001 | Cotichini et al. | 709/200 |
| 6,272,533 B1 | 8/2001 | Browne | |
| 6,272,637 B1 | 8/2001 | Little et al. | 713/194 |
| 6,282,650 B1 * | 8/2001 | Davis | 713/176 |
| 6,282,651 B1 | 8/2001 | Ashe | |
| 6,282,657 B1 | 8/2001 | Kaplan et al. | |
| 6,292,874 B1 | 9/2001 | Barnett | |
| 6,301,646 B1 | 10/2001 | Hostetter | |
| 6,308,270 B1 | 10/2001 | Guthery et al. | 726/9 |
| 6,314,409 B1 | 11/2001 | Schneck et al. | 705/54 |
| 6,321,314 B1 | 11/2001 | Van Dyke | |
| 6,330,670 B1 | 12/2001 | England et al. | 713/2 |
| 6,339,815 B1 | 1/2002 | Feng et al. | |
| 6,339,816 B1 | 1/2002 | Bausch | |
| 6,357,004 B1 * | 3/2002 | Davis | 713/100 |
| 6,363,485 B1 | 3/2002 | Adams | 713/186 |
| 6,374,286 B1 | 4/2002 | Gee et al. | 718/108 |
| 6,374,317 B1 | 4/2002 | Ajanovic et al. | 710/105 |
| 6,378,072 B1 | 4/2002 | Collins et al. | 713/187 |
| 6,389,537 B1 * | 5/2002 | Davis et al. | 713/187 |
| 6,397,242 B1 | 5/2002 | Devine et al. | 718/1 |
| 6,412,035 B1 | 6/2002 | Webber | 710/261 |
| 6,421,702 B1 | 7/2002 | Gulick | 718/102 |
| 6,435,416 B1 | 8/2002 | Slassi | 253/492 |
| 6,445,797 B1 | 9/2002 | McGough et al. | 380/285 |
| 6,463,535 B1 * | 10/2002 | Drews | 713/176 |
| 6,463,537 B1 | 10/2002 | Tello | 713/182 |
| 6,499,123 B1 | 12/2002 | McFarland et al. | |
| 6,505,279 B1 | 1/2003 | Phillips et al. | |
| 6,507,904 B1 * | 1/2003 | Ellison et al. | 712/229 |
| 6,535,988 B1 * | 3/2003 | Poisner | 713/500 |
| 6,557,104 B1 | 4/2003 | Vu et al. | 713/189 |
| 6,633,963 B1 * | 10/2003 | Ellison et al. | 711/163 |
| 6,633,981 B1 * | 10/2003 | Davis | 713/189 |
| 6,678,825 B1 * | 1/2004 | Ellison et al. | 713/200 |
| 2001/0021969 A1 | 9/2001 | Burger et al. | |
| 2001/0027527 A1 | 10/2001 | Khidekel et al. | |
| 2001/0037450 A1 | 11/2001 | Metlitski et al. | |
| 2002/0144121 A1 * | 10/2002 | Ellison et al. | 713/176 |
| 2003/0018892 A1 | 1/2003 | Tello | 713/164 |

FOREIGN PATENT DOCUMENTS

| | | |
|---|---|---|
| EP | 0473913 | 3/1992 |
| EP | 0600112 | 8/1994 |
| EP | 0930567 A | 7/1999 |
| EP | 1 030 237 A | 8/2000 |
| EP | 1146715 | 10/2001 |
| WO | WO 97/29567 | 8/1997 |
| WO | WO9834365 A | 8/1998 |
| WO | WO9844402 | 10/1998 |
| WO | WO9905600 | 2/1999 |
| WO | WO9909482 | 2/1999 |
| WO | WO9957863 | 11/1999 |
| WO | WO0062232 | 10/2000 |
| WO | WO 01/27723 | 4/2001 |
| WO | WO 01/27821 | 4/2001 |
| WO | WO 01/75565 | 10/2001 |
| WO | WO 01/75595 | 10/2001 |
| WO | WO-0217555 | 2/2002 |
| WO | WO-0175564 | 10/2002 |
| WO | WO-02086684 | 10/2002 |

OTHER PUBLICATIONS

"Intel 386 DX Microprocessor 32-Bit CHMOS Microprocessor with Integrated Memory Management", Dec. 31, 1995, Intel Inc., p. 32-56; FIG. 4-14.

Joe Heinrich:"MIPS R4000 Microprocessor User's Manual", 1994, MIPS Technology Inc., Mountain View, CA, pp. 67-79.

Berg C: "How Do I Create A Signed Applet?", Dr. Dobb's Journal, M&T Publ., Redwood City, CA, US, vol. 22, No. 8, 8 '97, p. 109-111, 122.

Gong L et al: "Going Beyond the Sandbox: An Overview of the New Security Architecture in the Java Development Kit 1.2", Proceedings of the Usenix Symposium on Internet Technologies and Systems, Montery, CA 12 '97. pp. 103-112.

J. Heinrich: "MIPS R4000 Microprocessor User's Manual," Apr. 1, 1993, MIPS, Mt. View, XP002184449, pp. 61-97. *Franzis Verlag GMBH, Munchen, DE,* vol. 40, No. 16, XP000258620,(100-103),Aug. 6, 1991.

Robin, John S., et al., "Analysis of the Pentium's Ability to Support a Secure Virtual Machine Monitor", *Proceedings of the 9th USENIX Security Symposium, XP002247347*, Denver, Colorado, (Aug. 14, 2000), 1-17.

Saez, Sergio, et al., "A Hardware Scheduler for Complex Real-Time Systems", *Proceedings of the IEEE International Symposium on Industrial Electronics*, XP002190615, (Jul. 1999),43-48.

Sherwood, Timothy, et al., "Patchable Instruction ROM Architecture", *Department of Computer Science and Engineering, University of California, San Diego, La Jolla, CA*, (Nov. 2001).

Brands, Stefan, "Restrictive Blinding of Secret-Key Certificates", Springer-Verlag XP002201306, (1995), Chapter 3.

Chien, Andrew A., et al., "Safe and Protected Execution for the Morph/AMRM Reconfigurable Processor", *7th Annual IEEE Symposium, FCCM '99 Proceedings, XP010359180, ISBN 0-7695-0375-6,* Los Alamitos, CA. (Apr. 21, 1999), 209-221.

Compaq Computer Corporation, et al., "Trusted Computing Platform Alliance (TCPA) Main Specification Version 1.1a", (Dec. 2000), 1-321.

Davida, George I., et al., "Defending Systems Against Viruses through Cryptographic Authentication", *Proceedings of the Symposium on Security and Privacy,* IEEE Comp. Soc. Press, ISBN 0-8186-1939-2,(May 1989).

IBM, "Information Display Technique for a Terminate Stay Resident Program IBM Technical Disclosure Bulletin", *TDB-ACC-No. NA9112156, vol. 34, Issue 7A* (Dec. 1, 1991), 156-158.

Karger, Paul A., et al., "A VMM Security Kernal for the VAX Architecture", *Proceedings of the Symposium on Research in Security and Privacy, XP010020182, ISBN 0-8186-2060-9,* Boxborough, MA, (May 7, 1990),2-19.

Kashiwagi, Kazuhiko, et al., "Design and Implementation of Dynamically Reconstructing System Software", *Software Engineering Conference,* Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn, et al., "Replacement Strategy for Aging Avionics Computers", *IEEE AES Systems Magazine,* XP002190614,(Mar. 1999).

Menezes, Oorschot, "Handbook of Applied Cryptography ", *CRC Press LLC, USA XP002201307,* (1997),475.

Richt, Stefan, et al., "In-Circuit-Emulator Wind Echtzeit-tauglich", *Elektronic.*

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1-31.

* cited by examiner

ATTESTATION KEY MEMORY DEVICE AND BUS

BACKGROUND

1. Field of the Invention

This invention relates to microprocessors. In particular, the invention relates to processor security.

2. Description of Related Art

Advances in microprocessor and communication technologies have opened up many opportunities for applications that go beyond the traditional ways of doing business. Electronic commerce (E-commerce) and business-to-business (B2B) transactions are now becoming popular, reaching the global markets at a fast rate. Unfortunately, while modern microprocessor systems provide users convenient and efficient methods of doing business, communicating and transacting, they are also vulnerable to unscrupulous attacks. Examples of these attacks include virus, intrusion, security breach, and tampering, to name a few. Computer security, therefore, is becoming more and more important to protect the integrity of the computer systems and increase the trust of users.

Threats caused by unscrupulous attacks may be in a number of forms. Attacks may be remote without requiring physical accesses. An invasive remote-launched attack by hackers may disrupt the normal operation of a system connected to thousands or even millions of users. A virus program may corrupt code and/or data of a single-user platform.

Existing techniques to protect against attacks have a number of drawbacks. Anti-virus programs can only scan and detect known viruses. Most anti-virus programs use a weak policy in which a file or program is assumed good until proved bad. For many security applications, this weak policy may not be appropriate. In addition, most anti-virus programs are used locally where they are resident in the platform. This may not be suitable in a group work environment. Security co-processors or smart cards using cryptographic or other security techniques have limitations in speed performance, memory capacity, and flexibility. Redesigning operating systems creates software compatibility issues and causes tremendous investment in development efforts.

BRIEF DESCRIPTION OF THE DRAWINGS

The features and advantages of the present invention will become apparent from the following detailed description of the present invention in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Architecture Overview

One principle for providing security in a computer system or platform is the concept of an isolated execution architecture. The isolated execution architecture includes logical and physical definitions of hardware and software components that interact directly or indirectly with an operating system of the computer system or platform. An operating system and the processor may have several levels of hierarchy, referred to as rings, corresponding to various operational modes. A ring is a logical division of hardware and software components that are designed to perform dedicated tasks within the operating system. The division is typically based on the degree or level of privilege, namely, the ability to make changes to the platform. For example, a ring-0 is the innermost ring, being at the highest level of the hierarchy. Ring-0 encompasses the most critical, privileged components. In addition, modules in Ring-0 can also access to lesser privileged data, but not vice versa. Ring-3 is the outermost ring, being at the lowest level of the hierarchy. Ring-3 typically encompasses users or applications level and has the least privilege. Ring-1 and ring-2 represent the intermediate rings with decreasing levels of privilege.

Figure 1A:
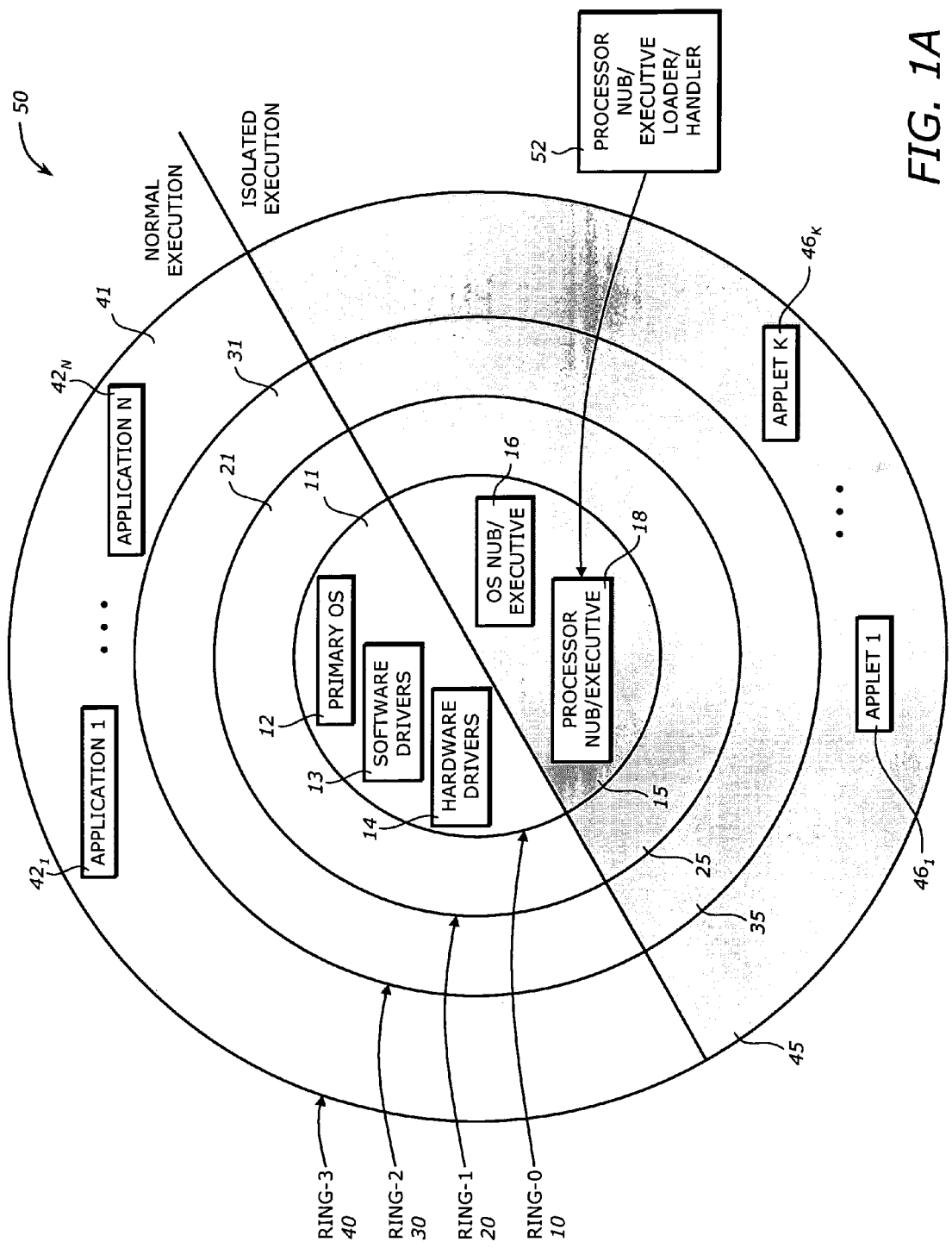
FIG. 1A is a diagram illustrating a logical architecture according to one embodiment of the invention.

FIG. 1A is a diagram illustrating a logical operating architecture 50 according to one embodiment of the invention. The logical operating architecture 50 is an abstraction of the components of an operating system and the processor. The logical operating architecture 50 includes ring-0 10, ring-1 20, ring-2 30, ring-3 40, and a processor nub loader 52. The processor nub loader 52 is an instance of an processor executive (PE) handler. The PE handler is used to handle and/or manage a processor executive (PE) as will be discussed later. The logical operating architecture 50 has two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system, usually referred to as kernel. These software modules include primary operating system (e.g., kernel) 12, software drivers 13, and hardware drivers 14. The isolated execution Ring-0 15 includes an operating system (OS) nub 16 and a processor nub 18. The OS nub 16 and the processor nub 18 are instances of an OS executive (OSE) and processor executive (PE), respectively. The OSE and the PE are part of executive entities that operate in a secure environment associated with the isolated area 70 and the isolated execution mode. The processor nub loader 52 is a protected bootstrap loader code held within a chipset in the system and is responsible for loading the processor nub 18 from the processor or chipset into an isolated area as will be explained later.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$ to $42_N$ and isolated execution ring-3 includes K applets $46_1$ to $46_K$.

One concept of the isolated execution architecture is the creation of an isolated region in the system memory, referred to as an isolated area, which is protected by both the processor and chipset in the computer system. The isolated region may also be in cache memory, protected by a translation look aside (TLB) access check. Access to this isolated region is permitted only from a front side bus (FSB) of the processor, using special bus (e.g., memory read and write) cycles, referred to as isolated read and write cycles. The special bus cycles are also used for snooping. The isolated read and write cycles are issued by the processor executing in an isolated execution mode. The isolated execution mode is initialized using a privileged instruction in the processor, combined with the processor nub loader 52. The processor nub loader 52 verifies and loads a ring-0 nub software module (e.g., processor nub 18) into the isolated area. The processor nub 18 provides hardware-related services for the isolated execution.

One task of the processor nub 18 is to verify and load the ring-0 OS nub 16 into the isolated area, and to generate the root of a key hierarchy unique to a combination of the platform, the processor nub 18, and the operating system nub 16. The operating system nub 16 provides links to services in the primary OS 12 (e.g., the unprotected segments of the operating system), provides page management within the isolated area, and has the responsibility for loading ring-3 application modules 45, including applets $46_1$ to $46_K$, into protected pages allocated in the isolated area. The operating system nub 16 may also load ring-0 supporting modules.

The operating system nub 16 may choose to support paging of data between the isolated area and ordinary (e.g., non-isolated) memory. If so, then the operating system nub 16 is also responsible for encrypting and hashing the isolated area pages before evicting the page to the ordinary memory, and for checking the page contents upon restoration of the page. The isolated mode applets $46_1$ to $46_K$ and their data are tamper-resistant and monitor-resistant from all software attacks from other applets, as well as from non-isolated-space applications (e.g., $42_1$ to $42_N$), dynamic link libraries (DLLs), drivers and even the primary operating system 12. Only the processor nub 18 or the operating system nub 16 can interfere with or monitor the applet's execution.

Figure 1B:
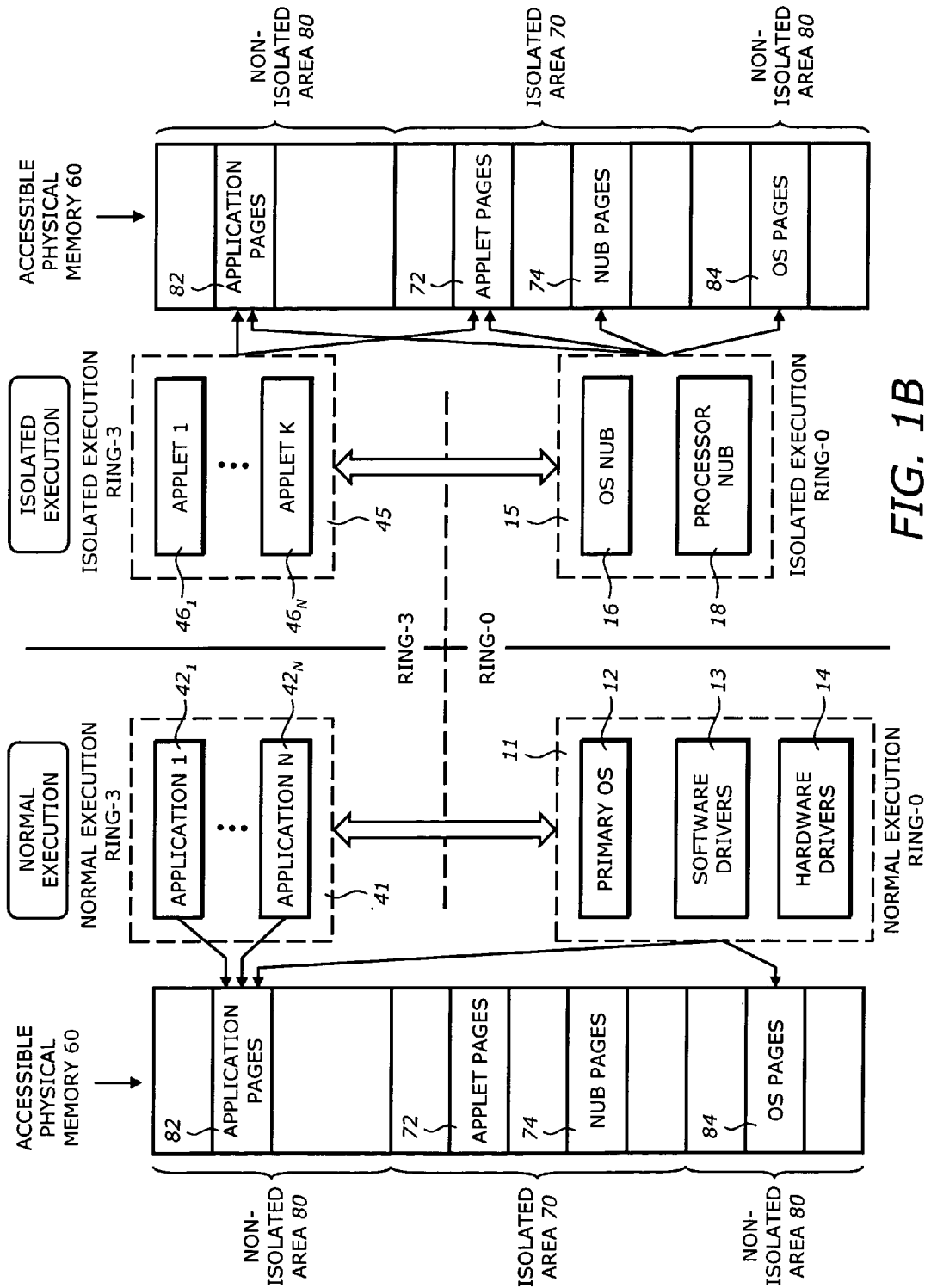
FIG. 1B is a diagram illustrating accessibility of various elements in the operating system and the processor according to one embodiment of the invention.

FIG. 1B is a diagram illustrating accessibility of various elements in the operating system 10 and the processor according to one embodiment of the invention. For illustration purposes, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system pages 84. The isolated area 70 is accessible only to elements of the operating system and processor operating in isolated execution mode. The non-isolated area 80 is accessible to all elements of the ring-0 operating system and to the processor.

The normal execution ring-0 11 including the primary OS 12, the software drivers 13, and the hardware drivers 14, can access both the OS pages 84 and the application pages 82. The normal execution ring-3, including applications $42_1$ to $42_N$, can access only to the application pages 82. Both the normal execution ring-0 11 and ring-3 41, however, cannot access the isolated area 70.

The isolated execution ring-0 15, including the OS nub 16 and the processor nub 18, can access to both of the isolated area 70, including the applet pages 72 and the nub pages 74, and the non-isolated area 80, including the application pages 82 and the OS pages 84. The isolated execution ring-3 45, including applets $46_1$ to $46_K$ can access only to the application pages 82 and the applet pages 72. The applets $46_1$ to $46_K$ reside in the isolated area 70.

Figure 1C:
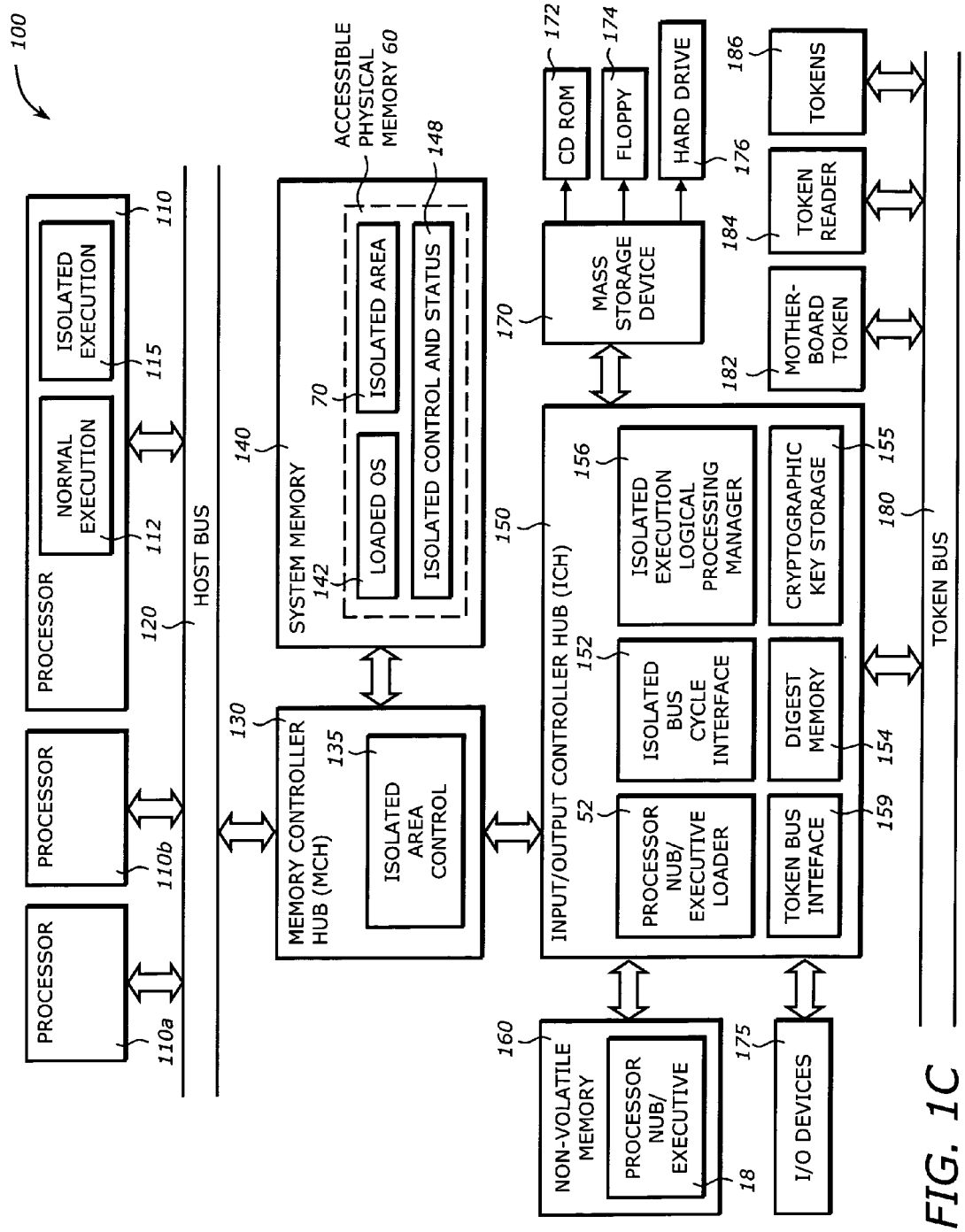
FIG. 1C is a diagram illustrating a computer system in which one embodiment of the invention can be practiced.

FIG. 1C is a diagram illustrating a computer system 100 in which one embodiment of the invention can be practiced. The computer system 100 includes a processor 110, a host bus 120, a memory controller hub (MCH) 130, a system memory 140, an input/output controller hub (ICH) 150, a non-volatile memory, or system flash, 160, a mass storage device 170, input/output devices 175, a token bus 180, a motherboard (MB) token 182, a reader 184, and a token 186. The MCH 130 may be integrated into a chipset that integrates multiple functionalities such as the isolated execution mode, host-to-peripheral bus interface, memory control. Similarly, the ICH 150 may also be integrated into a chipset together or separate from the MCH 130 to perform I/O functions. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with an Intel Architecture (IA) processor, such as the Pentium™ series, the IA-32™ and the IA-64™. The processor 110 includes a normal execution mode 112 and an isolated execution circuit 115. The normal execution mode 112 is the mode in which the processor 110 operates in a non-secure environment, or a normal environment without the security features provided by the isolated execution mode. The isolated execution circuit 115 provides a mechanism to allow the processor 110 to operate in an isolated execution mode. The isolated execution circuit 115 provides hardware and software support for the isolated execution mode. This support includes configuration for isolated execution, definition of an isolated area, definition (e.g., decoding and execution) of isolated instructions, generation of isolated access bus cycles, and generation of isolated mode interrupts.

In one embodiment, the computer system 100 can be a single processor system, such as a desktop computer, which has only one main central processing unit, e.g. processor 110. In other embodiments, the computer system 100 can include multiple processors, e.g. processors 110, 110a, 110b, etc., as shown in FIG. 1C. Thus, the computer system 100 can be a multi-processor computer system having any number of processors. For example, the multi-processor computer system 100 can operate as part of a server or workstation environment. The basic description and operation of processor 110 will be discussed in detail below. It will be appreciated by those skilled in the art that the basic description and operation of processor 110 applies to the other processors 110a and 110b, shown in FIG. 1C, as well as any number of other processors that may be utilized in the multi-processor computer system 100 according to one embodiment of the present invention.

The processor 110 may also have multiple logical processors. A logical processor, sometimes referred to as a thread, is a functional unit within a physical processor having an architectural state and physical resources allocated according to some partitioning policy. Within the context of the present invention, the terms "thread" and "logical processor" are used to mean the same thing. A multi-threaded processor is a processor having multiple threads or multiple logical processors. A multi-processor system (e.g., the system comprising the processors 110, 110a, and 110b) may have multiple multi-threaded processors.

The host bus 120 provides interface signals to allow the processor 110 or processors 110, 100a, and 110b to communicate with other processors or devices, e.g., the MCH 130. In addition to normal mode, the host bus 120 provides an isolated access bus mode with corresponding interface signals for memory read and write cycles when the processor 110 is configured in the isolated execution mode. The isolated access bus mode is asserted on memory accesses initiated while the processor 110 is in the isolated execution mode. The isolated access bus mode is also asserted on instruction pre-fetch and cache write-back cycles if the address is within the isolated area address range and the processor 110 is initialized in the isolated execution mode. The processor 110 responds to snoop cycles to a cached address within the isolated area address range if the isolated access bus cycle is asserted and the processor 110 is initialized into the isolated execution mode.

The MCH 130 provides control and configuration of memory and input/output devices such as the system memory 140 and the ICH 150. The MCH 130 provides interface circuits to recognize and service isolated access assertions on memory reference bus cycles, including isolated memory read and write cycles. In addition, the MCH 130 has memory range registers (e.g., base and length registers) to represent the isolated area in the system memory 140. Once configured, the MCH 130 aborts any access to the isolated area that does not have the isolated access bus mode asserted.

The system memory 140 stores system code and data. The system memory 140 is typically implemented with dynamic random access memory (DRAM) or static random access memory (SRAM). The system memory 140 includes the accessible physical memory 60 (shown in FIG. 1B). The accessible physical memory includes a loaded operating system 142, the isolated area 70 (shown in FIG. 1B), and an isolated control and status space 148. The loaded operating system 142 is the portion of the operating system that is loaded into the system memory 140. The loaded OS 142 is typically loaded from a mass storage device via some boot code in a boot storage such as a boot read only memory (ROM). The isolated area 70, as shown in FIG. 1B, is the memory area that is defined by the processor 110 when operating in the isolated execution mode. Access to the isolated area 70 is restricted and is enforced by the processor 110 and/or the MCH 130 or other chipset that integrates the isolated area functionalities. The isolated control and status space 148 is an input/output (I/O)-like, independent address space defined by the processor 110 and/or the MCH 130. The isolated control and status space 148 contains mainly the isolated execution control and status registers. The isolated control and status space 148 does not overlap any existing address space and is accessed using the isolated bus cycles. The system memory 140 may also include other programs or data which are not shown.

The ICH 150 represents a known single point in the system having the isolated execution functionality. For clarity, only one ICH 150 is shown. The system 100 may have many ICH's similar to the ICH 150. When there are multiple ICH's, a designated ICH is selected to control the isolated area configuration and status. In one embodiment, this selection is performed by an external strapping pin. As is known by one skilled in the art, other methods of selecting can be used, including using programmable configuring registers. The ICH 150 has a number of functionalities that are designed to support the isolated execution mode in addition to the traditional I/O functions. In particular, the ICH 150 includes an isolated bus cycle interface 152, the processor nub loader 52 (shown in FIG. 1A), a digest memory 154, a cryptographic key storage 155, an isolated execution logical processor manager 156, and a token bus interface 159.

The isolated bus cycle interface 152 includes circuitry to interface to the isolated bus cycle signals to recognize and service isolated bus cycles, such as the isolated read and write bus cycles. The processor nub loader 52, as shown in FIG. 1A, includes a processor nub loader code and its digest (e.g., hash) value. The processor nub loader 52 is invoked by execution of an appropriate isolated instruction (e.g., Iso_Init) and is transferred to the isolated area 70. From the isolated area 80, the processor nub loader 52 copies the processor nub 18 from the system flash memory (e.g., the processor nub code 18 in non-volatile memory 160) into the isolated area 70, verifies and logs its integrity, and manages a symmetric key used to protect the processor nub's secrets. In one embodiment, the processor nub loader 52 is implemented in read only memory (ROM). For security purposes, the processor nub loader 52 is unchanging, tamper-resistant and non-substitutable. The digest memory 154, typically implemented in RAM, stores the digest (e.g., hash) values of the loaded processor nub 18, the operating system nub 16, and any other critical modules (e.g., ring-0 modules) loaded into the isolated execution space. The cryptographic key storage 155 holds a symmetric encryption/decryption key that is unique for the platform of the system 100. In one embodiment, the cryptographic key storage 155 includes internal fuses that are programmed at manufacturing. Alternatively, the cryptographic key storage 155 may also be created with a random number generator and a strap of a pin. The isolated execution logical processor manager 156 manages the operation of logical processors operating in isolated execution mode. In one embodiment, the isolated execution logical processor manager 156 includes a logical processor count register that tracks the number of logical processors participating in the isolated execution mode. The token bus interface 159 interfaces to the token bus 180. A combination of the processor nub loader digest, the processor nub digest, the operating system nub digest, and optionally additional digests, represents the overall isolated execution digest, referred to as isolated digest. The isolated digest is a fingerprint identifying the ring-0 code controlling the isolated execution configuration and operation. The isolated digest is used to attest or prove the state of the current isolated execution.

The non-volatile memory 160 stores non-volatile information. Typically, the non-volatile memory 160 is implemented in flash memory. The non-volatile memory 160 includes the processor nub 18. The processor nub 18 provides the initial set-up and low-level management of the isolated area 70 (in the system memory 140), including verification, loading, and logging of the operating system nub 16, and the management of the symmetric key used to protect the operating system nub's secrets. The processor nub 18 may also provide application programming interface (API) abstractions to low-level security services provided by other hardware. The processor nub 18 may also be distributed by the original equipment manufacturer (OEM) or operating system vendor (OSV) via a boot disk.

The mass storage device 170 stores archive information such as code (e.g., processor nub 18), programs, files, data, applications (e.g., applications $42_1$ to $42_N$), applets (e.g., applets $46_1$ to $46_K$) and operating systems. The mass storage device 170 may include compact disk (CD) ROM 172, floppy diskettes 174, and hard drive 176, and any other magnetic or optical storage devices. The mass storage device 170 provides a mechanism to read machine-readable media. When implemented in software, the elements of the present invention are the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk CD-ROM, an optical disk, a hard disk, a fiber optical medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, an Intranet, etc.

I/O devices 175 may include any I/O devices to perform I/O functions. Examples of I/O devices 175 include a controller for input devices (e.g., keyboard, mouse, trackball, pointing device), media card (e.g., audio, video, graphics), a network card, and any other peripheral controllers.

The token bus 180 provides an interface between the ICH 150 and various tokens in the system. A token is a device that performs dedicated input/output functions with security functionalities. A token has characteristics similar to a smart card, including at least one reserved-purpose public/private key pair and the ability to sign data with the private key. Examples of tokens connected to the token bus 180 include a motherboard token 182, a token reader 184, and other portable tokens 186 (e.g., smart card). The token bus interface 159 in the ICH 150 connects through the token bus 180 to the ICH 150 and ensures that when commanded to prove the state of the isolated execution, the corresponding token (e.g., the motherboard token 182, the token 186) signs only valid isolated digest information. For purposes of security, the token should be connected to the digest memory.

Attestation Key Memory (AKM) Device and Bus

In an embodiment of the present invention, a technique is provided for remote attestation. The remote attestation is performed by a device operating in a remote manner with respect to the MCH 130 and the ICH 150 (FIG. 1C). Examples of this device include one of the tokens 186. This device is referred to as an attestation key memory (AKM) device. This remote attestation is performed by using a public-private key pair to attest that the isolated execution mode is running with a particular software configuration. Depending on the need of the software utilizing the attestation, the results can be bonded to the platform embodying the secure environment such that future attestation is not required unless there is a significant change in the software configuration. The AKM device contains one or more key pair and may be inserted into the platform by the end user needed to perform the attestation.

The AKM device provide a simple model for users to understand when there are privacy and anonymity issues. It produces a tangible device that can be used to draw attention to the otherwise obscure investment going into security. In addition, the AKM device offers some advantages and benefits over a non-pluggable device approach.

The benefits of using an AKM device includes: distribution of the private key, replacement or removal of the private key if desired, usage of more than one key if desired, remote verification of software on an unknown machine by a remote server, provision of value-added features via the interface bus (e.g., the token bus 180 shown in FIG. 1C).

In an embodiment of the present invention, an interface maps a device (e.g., the AKM device) via a bus (e.g., the token bus 180 shown in FIG. 1C) to an address space of a chipset (e.g., the ICH 150 shown in FIG. 1C) in a secure environment for an isolated execution mode. The secure environment is associated with an isolated memory area accessible by at least one processor. The at least one processor operates in one of a normal execution mode and the isolated execution mode. A communication storage corresponding to the address space allows the device to exchange security information with the at least one processor in the isolated execution mode in a remote attestation.

Figure 2:
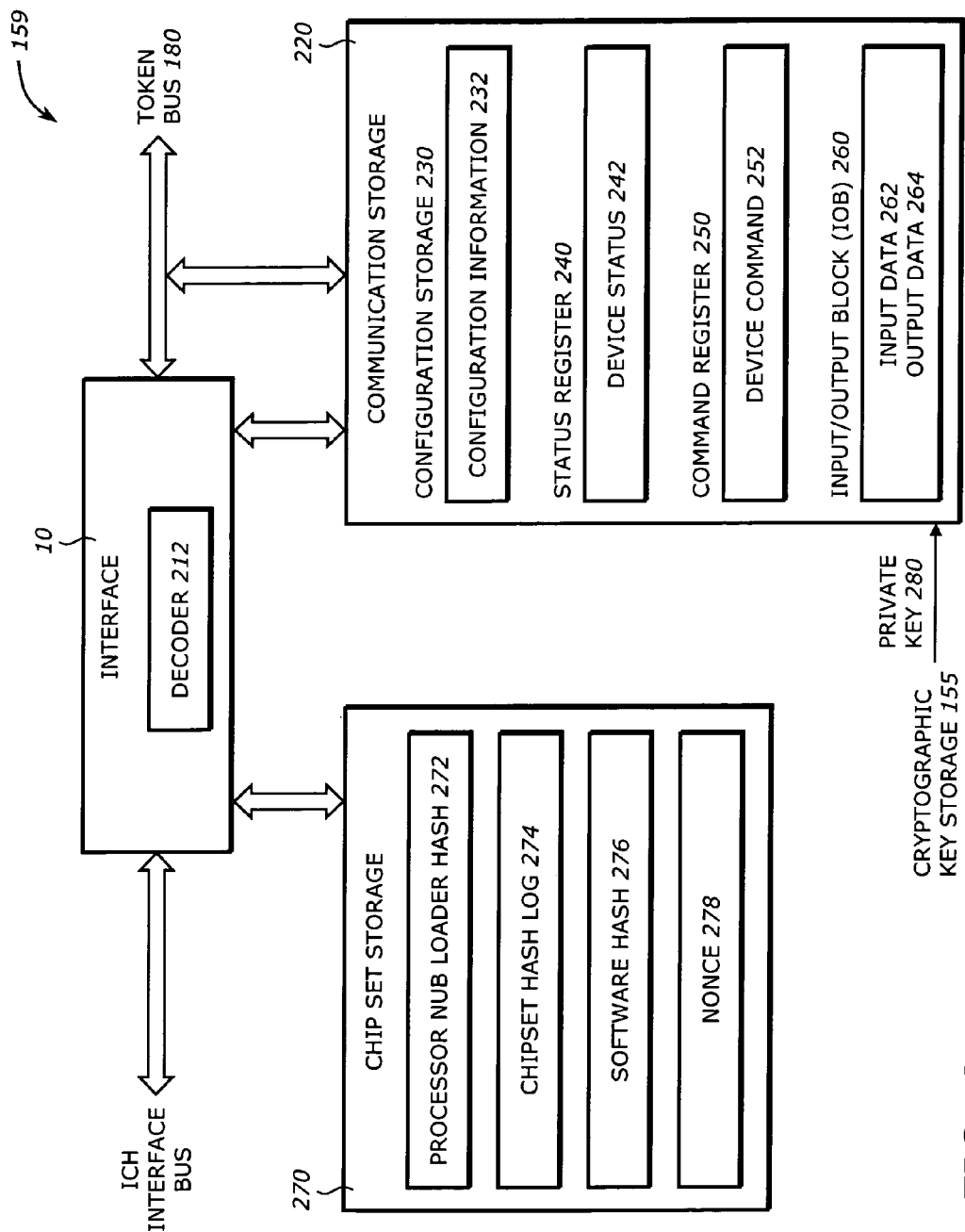
FIG. 2 is a diagram illustrating the token bus interface shown in FIG. 1C according to one embodiment of the invention.

FIG. 2 is a diagram illustrating the token bus interface 159 shown in FIG. 1C according to one embodiment of the invention. The token bus interface 159 includes an interface 210, a communication storage 220, and a chipset storage 270.

The interface 210 provides an interface between an external device (e.g., the tokens 186 shown in FIG. 1C) coupled to the token bus 180 (FIG. 1C and the chipset (e.g., the ICH 150). The interface 210 includes a decoder 212. The decoder 212 decodes the address space onto the bus 180 so that an access to the chipset is passed to the device. Typically the address space is a subset of the address space of the chipset 150. In addition, the decoder 212 allows the device 186 to access the chipset storage 270.

The communication storage 220 is mapped to the address space and allows the device 186 to exchange security information with the chipset 150 or the processor 110. The communication storage 220 includes a configuration storage 230, a status register 240, a command register 250, and an input/output block (IOB) 260. The configuration storage 230 stores configuration information 232. The status register 240 stores device status 242. The command register 250 stores device command 252. The IOB 260 stored input data 262 and output data 264.

The chipset storage 270 stores chipset information such as the system digest in the digest memory 154 (FIG. 1C). In particular, the chipset storage 270 includes a processor nub loader hash 272, a chipset hash log 274, a software hash 276, and a nonce 278. The processor nub loader hash 272 and the chipset hash log 274 can be read directly by the AKM device 186 and cannot be intercepted by the running software. The software hash 276 and the nonce 278 are provided by the processor nub 18 (FIG. 1A).

Figure 3:
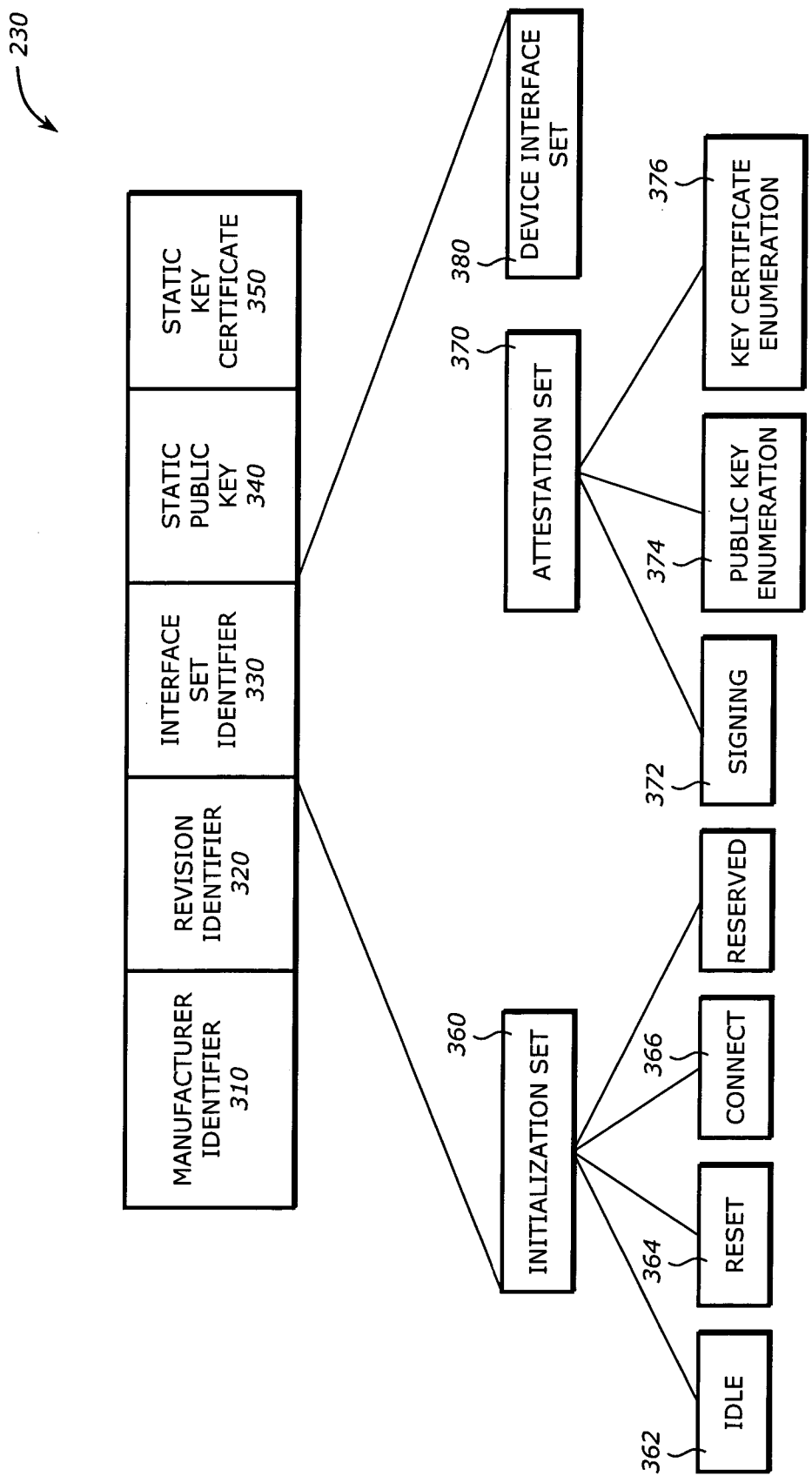
FIG. 3 is a diagram illustrating the configuration storage shown in FIG. 2 according to one embodiment of the invention.

FIG. 3 is a diagram illustrating the configuration storage 230 shown in FIG. 2 according to one embodiment of the invention. The configuration storage 230 includes a manufacturer identifier 310, a revision identifier 320, an interface set identifier 330, a static public key 340, and a static key certificate 350. The configuration storage includes a plurality of sub-storages (e.g., public key storage, key certificate storage, interface set storage, revision storage). Typically, the configuration storage 230 is read-only.

The manufacturer identifier 310 identifies the manufacturer of the AKM device 186. The revision identifier 320 provides a revision number of the AKM device 186. The interface set identifier 330 identifies the interface set that is supported by the device 186. The static public key 340 is a public key with a short key identification. The key certificate 350 is a key certificate with a short key identification.

The interface set identified by the interface set identifier 330 identifies may include an initialization set 360, an attestation set 370, and a device interface set 380. For a typical remote attestation, the initialization set 360 is needed. The initialization set 360 may be hardcoded and is used to reset and initialize the device. The initialization set 360 includes an idle state 362, a reset command 364, a connect command 366, and a reserved operation 368. The idle state 362 indicates that the device is not performing any meaningful operation and is idle. The reset command 364 causes the device to reset and perform a self-test operation. The connect command 366 sets the connect bit in the status register 240. The reserved operation 368 is to be reserved for other operations or commands or for non-implemented operation. A command that corresponds to the reserved operation 368 results in a "not-supported" error.

The attestation set 370 includes a signing operation 372, a public key enumeration 374, and a key certificate enumeration 376. The signing operation 372 provides the remote attestation to verify the validity of the platform running a particular software in the secure environment. The public key enumeration 374 enumerates any additional public keys that are not part of the static configuration information 232 (shown in FIG. 2). The key certificate enumeration 376 enumerates any additional key certificates that are not part of the static configuration information 232 (shown in FIG. 2).

The device interface set 380 is any additional interface set that can be supported by the AKM device in addition to the initialization set 360 and the attestation set 370.

When the device receives a command, it performs the operation as specified. During this time, the device may update the status register to report any conditions. When the operation is completed, the device writes the result in the IOB 260, clears a time estimate in the status register (discussed below), and clears the command register. When the host processor 110 polls the command register, a zero value indicates the device is idle. The processor 110 then can check the status register 240 for any device fatal error. If there is no fatal error, the host then reads the results from the IOB 260.

Figures 4, 5:
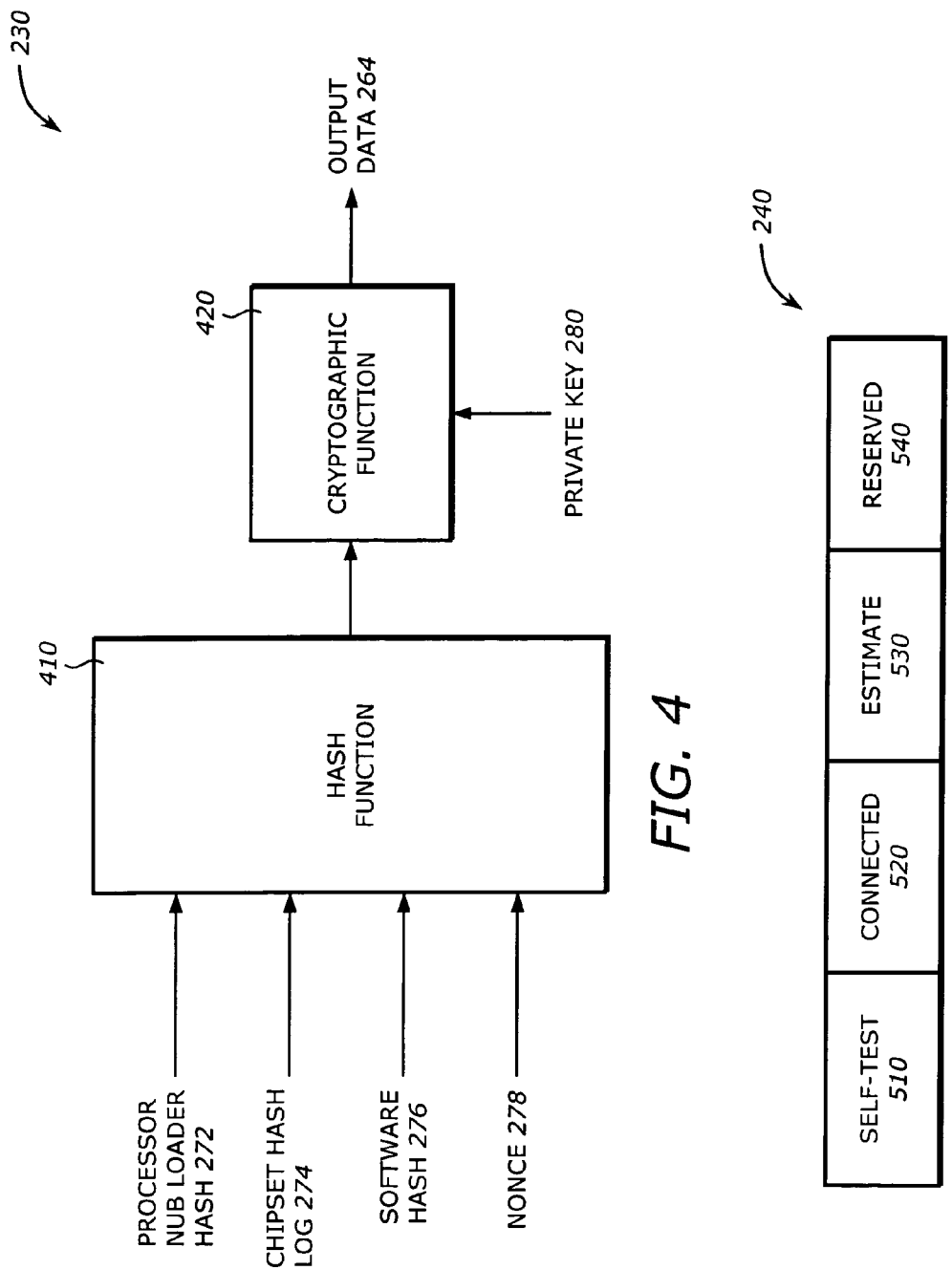
FIG. 4 is a diagram illustrating the signing operation shown in FIG. 3 according to one embodiment of the invention.
FIG. 5 is a diagram illustrating the status register shown in FIG. 3 according to one embodiment of the invention.

FIG. 4 is a diagram illustrating the signing operation 372 shown in FIG. 3 according to one embodiment of the invention. The signing operation 372 includes a hash function 410 and a cryptographic function 420.

The hash function 410 performs hashing on the processor nub loader hash 272, the chipset hash log 274, the software hash 276, and the nonce 278. The result of this hashing operation is then encrypted by the cryptographic function 420 using the private key 280 stored in the chipset. The result of the encryption becomes the output data 264 to be stored in the IOB 260. When the signing operation 372 is complete, the processor nub 18 retrieves the result from the IOB 260.

FIG. 5 is a diagram illustrating the status register shown in FIG. 3 according to one embodiment of the invention. The status register 240 includes a self-test field 510, a connection field 520, an estimate field 530, and a reserved field 540.

The self-test field 510 provides a result of the self-test operation in response to the reset command. The result may include a failure. When there is a failure, all results from the device are ignored. This failure code is typically reset by a reset command or a system reset. The connection field 520 indicates that the device is responsive to the connect command. The estimate field 530 provides an estimate in some time unit (e.g., milliseconds) to indicate how long a current operation is expected to take. For example, a value zero indicates that it is less the a millisecond to complete. The reserved field 540 is reserved for future use.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   an interface to map a device via a bus to an address space of a chipset in a secure environment for an isolated execution mode, the secure environment being associated with an isolated memory area accessible by at least one processor, the at least one processor operating in one of a normal execution mode and the isolated execution mode; and
   a communication storage corresponding to the address space to allow the device to exchange security information with the at least one processor in the isolated execution mode in a remote attestation.

2. The apparatus of claim 1 wherein the security information includes at least one of a static public key and a static key certificate.

3. The apparatus of claim 2 wherein the interface comprises:
   a decoder to decode the address space onto the bus so that an access to the chipset is passed to the device.

4. The apparatus of claim 3 wherein the device accesses a chipset storage via the address space.

5. The apparatus of claim 4 wherein the communication storage comprises:
   a configuration storage to store device configuration information.

6. The apparatus of claim 5 wherein the communication storage further comprises:
   a status register to store device status of the device;
   a command register to store a device command for a command interface set; and
   an input/output block (IOB) to store input and output data corresponding to the command.

7. The apparatus of claim 6 wherein the configuration storage comprises:
   a public key storage to store the static public key;
   a key certificate storage to store the static key certificate; and
   an interface set storage to store an interface set identifier, the interface set identifier identifying a command interface set supported by the device.

8. The apparatus of claim 7 wherein the configuration storage further comprises:
a manufacturer identifier storage to store a manufacturer identifier; and
a revision storage to store a revision identifier.

9. The apparatus of claim 7 wherein the command interface set is an initialization set, the initialization set supporting a reset command and a connect command.

10. The apparatus of claim 7 wherein the command interface set is an attestation set, the attestation set performing at least one of a public key enumeration, a key certificate enumeration, and a signing operation.

11. The apparatus of claim 10 wherein the status register comprises:
a connection field to provide a connection status to indicate that the device is responsive to the connect command; and
an estimate field to provide an estimate of processing time for an operation specified in the command.

12. The apparatus of claim 11 wherein the status register further comprises:
a self-test field to indicate status of a self test in response to the reset command.

13. The apparatus of claim 10 wherein the public key enumeration enumerates an additional public key other than the static public key.

14. The apparatus of claim 10 wherein the key certificate enumeration enumerates an additional key certificate other than the static key certificate.

15. The apparatus of claim 10 wherein the sign operation generates a signature to attest validity of the secure environment using a private key provided by the chipset.

16. The apparatus of claim 15 wherein the signature corresponds to signing a chipset parameter.

17. The apparatus of claim 16 wherein the chipset parameter is one of a processor nub loader hash, a chipset hash log, a software hash, and a nonce.

18. The apparatus of claim 17 wherein the processor nub loader hash and the chipset hash log are stored in the chipset storage.

19. The apparatus of claim 18 wherein the software hash and the nonce are provided by a processor nub.

20. The apparatus of claim 19 wherein the output data include the signature.

21. A method comprising:
mapping a device via a bus to an address space of a chipset in a secure environment for an isolated execution mode, the secure environment being associated with an isolated memory area accessible by at least one processor, the at least one processor operating in one of a normal execution mode and the isolated execution mode; and
exchanging security information between the device and the at least one processor in the isolated execution mode in a remote attestation via a communication storage corresponding to the address space.

22. The method of claim 21 wherein the security information includes at least one of a static public key and a static key certificate.

23. The method of claim 22 wherein mapping comprises:
decoding the address space onto the bus so that an access to the chipset is passed to the device.

24. The method of claim 23 wherein the device accesses a chipset storage via the address space.

25. The method of claim 24 wherein exchanging comprises:
storing device configuration information in a configuration storage.

26. The method of claim 25 wherein exchanging further comprises:
storing device status of the device in a status register;
performing a device command corresponding to a command interface set to a command register; and
storing input and output data corresponding to the command in an input/output block (IOB).

27. The method of claim 26 wherein storing in the configuration storage comprises:
storing the static public key in a public key storage;
storing the static key certificate in a key certificate storage; and
storing an interface set identifier in an interface set storage, the interface set identifier identifying a command interface set supported by the device.

28. The method of claim 27 wherein storing in the configuration storage further comprises:
storing a manufacturer identifier in a manufacturer identifier storage; and
storing a revision identifier in a revision storage.

29. The method of claim 27 wherein performing the device command comprises performing a reset command and a connect command corresponding to an initialization set.

30. The method of claim 27 wherein performing the device command comprises performing at least one of a public key enumeration, a key certificate enumeration, and a signing operation, the public key enumeration, the key certificate enumeration, and the signing operation corresponding to an attestation set.

31. The method of claim 30 wherein storing the device status comprises:
providing a connection status to indicate that the device is responsive to the connect command; and
providing an estimate of processing time for an operation specified in the command.

32. The method of claim 31 wherein storing the device status further comprises:
indicating status of a self test in response to the reset command.

33. The method of claim 30 wherein performing the public key enumeration comprises enumerating an additional public key other than the static public key.

34. The method of claim 30 wherein performing the key certificate enumeration comprises enumerating an additional key certificate other than the static key certificate.

35. The method of claim 30 wherein performing the sign operation comprises generating a signature to attest validity of the secure environment using a private key provided by the chipset.

36. The method of claim 35 wherein the signature corresponds to signing a chipset parameter.

37. The method of claim 36 wherein the chipset parameter is one of a processor nub loader hash, a chipset hash log, a software hash, and a nonce.

38. The method of claim 37 wherein the processor nub loader hash and the chipset hash log are stored in the chipset storage.

39. The method of claim 38 wherein the software hash and the nonce are provided by a processor nub.

40. The method of claim 39 wherein the output data include the signature.

41. A computer program product comprising:
a machine readable medium having program code embedded therein, the computer program product comprising:
computer readable program code for mapping a device via a bus to an address space of a chipset in a secure environment for an isolated execution mode, the secure environment being associated with an isolated memory area accessible by at least one processor, the at least one processor operating in one of a normal execution mode and the isolated execution mode; and
computer readable program code for exchanging security information between the device and the at least one processor in the isolated execution mode in a remote attestation via a communication storage corresponding to the address space.

42. The computer program product of claim 41 wherein the security information includes at least one of a static public key and a static key certificate.

43. The computer program product of claim 42 wherein the computer readable program code for mapping comprises:
computer readable program code for decoding the address space onto the bus so that an access to the chipset is passed to the device.

44. The computer program product of claim 43 wherein the device accesses a chipset storage via the address space.

45. The computer program product of claim 44 wherein the computer readable program code for exchanging comprises:
computer readable program code for storing device configuration information in a configuration storage.

46. The computer program product of claim 45 wherein the computer readable program code for exchanging further comprises:
computer readable program code for storing device status of the device in a status register;
computer readable program code for performing a device command corresponding to a command interface set to a command register; and
computer readable program code for storing input and output data corresponding to the command in an input/output block (IOB).

47. The computer program product of claim 46 wherein the computer readable program code for storing in the configuration storage comprises:
computer readable program code for storing the static public key in a public key storage;
computer readable program code for storing the static key certificate in a key certificate storage; and
computer readable program code for storing an interface set identifier in an interface set storage, the interface set identifier identifying a command interface set supported by the device.

48. The computer program product of claim 47 wherein the computer readable program code for storing in the configuration storage further comprises:
computer readable program code for storing a manufacturer identifier in a manufacturer identifier storage; and
computer readable program code for storing a revision identifier in a revision storage.

49. The computer program product of claim 47 wherein the computer readable program code for performing the device command comprises performing a reset command and a connect command corresponding to an initialization set.

50. The computer program product of claim 47 wherein the computer readable program code for performing the device command comprises performing at least one of a public key enumeration, a key certificate enumeration, and a signing operation, the public key enumeration, the key certificate enumeration, and the signing operation corresponding to an attestation set.

51. The computer program product of claim 50 wherein the computer readable program code for storing the device status comprises:
computer readable program code for providing a connection status to indicate that the device is responsive to the connect command; and
computer readable program code for providing an estimate of processing time for an operation specified in the command.

52. The computer program product of claim 51 wherein the computer readable program code for storing the device status further comprises:
computer readable program code for indicating status of a self test in response to the reset command.

53. The computer program product of claim 50 wherein the computer readable program code for performing the public key enumeration comprises enumerating an additional public key other than the static public key.

54. The computer program product of claim 50 wherein the computer readable program code for performing the key certificate enumeration comprises enumerating an additional key certificate other than the static key certificate.

55. The computer program product of claim 50 wherein the computer readable program code for performing the sign operation comprises generating a signature to attest validity of the secure environment using a private key provided by the chipset.

56. The computer program product of claim 55 wherein the signature corresponds to signing a chipset parameter.

57. The computer program product of claim 56 wherein the chipset parameter is one of a processor nub loader hash, a chipset hash log, a software hash, and a nonce.

58. The computer program product of claim 57 wherein the processor nub loader hash and the chipset hash log are stored in the chipset storage.

59. The computer program product of claim 58 wherein the software hash and the nonce are provided by a processor nub.

60. The computer program product of claim 59 wherein the output data include the signature.

61. A system comprising:
at least one processor operating in a secure environment, the at least one processor having one of a normal execution mode and an isolated execution mode;
a memory coupled to the at least one processor, the memory having an isolated memory area accessible to the at least one processor in the isolated execution mode; and
a chipset coupled to the at least one processor and the memory, the chipset having a circuit, the circuit comprising:
an interface to map a device via a bus to an address space of the chipset in the secure environment, and
a communication storage corresponding to the address space to allow the device to exchange security information with the at least one processor in the isolated execution mode in a remote attestation.

62. The system of claim 61 wherein the security information includes at least one of a static public key and a static key certificate.

63. The system of claim 62 wherein the interface comprises:
a decoder to decode the address space onto the bus so that an access to the chipset is passed to the device.

64. The system of claim 63 wherein the device accesses a chipset storage via the address space.

65. The system of claim 64 wherein the communication storage comprises:
a configuration storage to store device configuration information.

66. The system of claim 65 wherein the communication storage further comprises:
a status register to store device status of the device;
a command register to store a device command for a command interface set; and
an input/output block (10B) to store input and output data corresponding to the command.

67. The system of claim 66 wherein the configuration storage comprises:
a public key storage to store the static public key;
a key certificate storage to store the static key certificate; and
an interface set storage to store an interface set identifier, the interface set identifier identifying a command interface set supported by the device.

68. The system of claim 67 wherein the configuration storage further comprises:
a manufacturer identifier storage to store a manufacturer identifier; and
a revision storage to store a revision identifier.

69. The system of claim 67 wherein the command interface set is an initialization set, the initialization set supporting a reset command and a connect command.

70. The system of claim 67 wherein the command interface set is an attestation set, the attestation set performing at least one of a public key enumeration, a key certificate enumeration, and a signing operation.

71. The system of claim 70 wherein the status register comprises:
a connection field to provide a connection status to indicate that the device is responsive to the connect command; and
an estimate field to provide an estimate of processing time for an operation specified in the command.

72. The system of claim 71 wherein the status register further comprises:
a self-test field to indicate status of a self test in response to the reset command.

73. The system of claim 70 wherein the public key enumeration enumerates an additional public key other than the static public key.

74. The system of claim 70 wherein the key certificate enumeration enumerates an additional key certificate other than the static key certificate.

75. The system of claim 70 wherein the sign operation generates a signature to attest validity of the secure environment using a private key provided by the chipset.

76. The system of claim 75 wherein the signature corresponds to signing a chipset parameter.

77. The system of claim 76 wherein the chipset parameter is one of a processor nub loader hash, a chipset hash log, a software hash, and a nonce.

78. The system of claim 77 wherein the processor nub loader hash and the chipset hash log are stored in the chipset storage.

79. The system of claim 78 wherein the software hash and the nonce are provided by a processor nub.

80. The system of claim 79 wherein the output data include the signature.

* * * * *